United States Patent
Sieg

(10) Patent No.: US 10,343,366 B2
(45) Date of Patent: Jul. 9, 2019

(54) METHOD FOR PRODUCING A COMPONENT FROM A SANDWICH MATERIAL AND COMPONENT PRODUCED FROM A SANDWICH MATERIAL

(71) Applicants: THYSSENKRUPP STEEL EUROPE AG, Duisburg (DE); thyssenkrupp AG, Essen (DE)

(72) Inventor: Hans-Joachim Sieg, Braunschweig (DE)

(73) Assignees: THYSSENKRUPP STEEL EUROPE AG, Duisburg (DE); thyssenkrupp AG, Essen (DE)

( * ) Notice: Subject to any disclaimer, the term of this patent is extended or adjusted under 35 U.S.C. 154(b) by 117 days.

(21) Appl. No.: 15/548,284

(22) PCT Filed: Jan. 28, 2016

(86) PCT No.: PCT/EP2016/051761
§ 371 (c)(1),
(2) Date: Aug. 2, 2017

(87) PCT Pub. No.: WO2016/124471
PCT Pub. Date: Aug. 11, 2016

(65) Prior Publication Data
US 2018/0264769 A1 Sep. 20, 2018

(30) Foreign Application Priority Data
Feb. 4, 2015 (DE) .......... 10 2015 201 879

(51) Int. Cl.
*B32B 1/04* (2006.01)
*B21D 5/01* (2006.01)
(Continued)

(52) U.S. Cl.
CPC .......... *B32B 1/04* (2013.01); *B21D 5/01* (2013.01); *B21D 5/08* (2013.01); *B23K 11/06* (2013.01);
(Continued)

(58) Field of Classification Search
CPC ...................................................... B32B 1/04
(Continued)

(56) References Cited

U.S. PATENT DOCUMENTS

| 3,649,398 A | 3/1972 | George |
| 5,347,099 A | 9/1994 | Gissinger |

(Continued)

FOREIGN PATENT DOCUMENTS

| DE | 69300125 T | 12/1995 |
| DE | 102007061918 A | 8/2008 |

(Continued)

OTHER PUBLICATIONS

English translation of International Search Report issued in PCT/EP2016/051761, dated May 25, 2016 (dated Jun. 17, 2016).
English abstract of DE102011055654A.

*Primary Examiner* — Brent T O'Hern
(74) *Attorney, Agent, or Firm* — Lathrop Gage L.L.P.

(57) ABSTRACT

A method can be used to produce a component from a sandwich material in sheet or strip form, which sandwich material comprises at least two metallic surface layers and a plastic layer disposed between the metallic surface layers. The method may involve at least partially heating the sandwich material along an edge region to soften the plastic in the edge region. The plastic may then be substantially completely displaced out of the edge region by exerting a force on at least one of the metallic surface layers. In this way a plastic-free edge region is produced in which the metallic surface layers are in contact in sub-regions or at (Continued)

a)

b)

points. Further, a component comprised of a sandwich material may include at least two metallic surface layers and a plastic layer disposed between the metallic surface layers. The sandwich material may have, at least along one edge, a plastic-free region in which the metallic surface layers are in contact in sub-regions or at points.

9 Claims, 2 Drawing Sheets

(51) Int. Cl.
| | |
|---|---|
| B21D 5/08 | (2006.01) |
| B32B 1/00 | (2006.01) |
| B32B 7/04 | (2019.01) |
| B32B 7/12 | (2006.01) |
| B32B 15/08 | (2006.01) |
| B32B 15/18 | (2006.01) |
| B32B 15/20 | (2006.01) |
| B32B 3/04 | (2006.01) |
| B23K 11/06 | (2006.01) |
| B23K 11/10 | (2006.01) |
| B23K 26/21 | (2014.01) |
| B23K 101/04 | (2006.01) |
| B23K 103/16 | (2006.01) |

(52) U.S. Cl.
CPC .............. *B23K 11/10* (2013.01); *B23K 26/21* (2015.10); *B32B 1/00* (2013.01); *B32B 3/04* (2013.01); *B32B 7/04* (2013.01); *B32B 7/12* (2013.01); *B32B 15/08* (2013.01); *B32B 15/18* (2013.01); *B32B 15/20* (2013.01); *B23K 2101/04* (2018.08); *B23K 2103/16* (2018.08); *B32B 2250/44* (2013.01); *B32B 2255/06* (2013.01); *B32B 2255/205* (2013.01); *B32B 2307/306* (2013.01); *B32B 2307/732* (2013.01); *B32B 2597/00* (2013.01); *B32B 2605/00* (2013.01)

(58) Field of Classification Search
USPC ........................................................ 428/121
See application file for complete search history.

(56) References Cited

U.S. PATENT DOCUMENTS

| | | |
|---|---|---|
| 6,910,253 B2 | 6/2005 | Lessard |
| 2008/0015580 A1 | 1/2008 | Chao |
| 2011/0123780 A1 | 5/2011 | Borger et al. |
| 2014/0298875 A1* | 10/2014 | Chergui ............... B23K 11/061 72/46 |
| 2015/0202844 A1 | 7/2015 | Boger et al. |

FOREIGN PATENT DOCUMENTS

| | | |
|---|---|---|
| DE | 102011054362 A | 4/2013 |
| DE | 102011055654 A | 5/2013 |
| DE | 102012106206 A | 1/2014 |

* cited by examiner a)

b)

METHOD FOR PRODUCING A COMPONENT FROM A SANDWICH MATERIAL AND COMPONENT PRODUCED FROM A SANDWICH MATERIAL

CROSS REFERENCE TO RELATED APPLICATIONS

This application is a U.S. National Stage Entry of International Patent Application Serial Number PCT/EP2016/051761, filed Jan. 28, 2016, which claims priority to German Patent Application No. DE 10 2015 201 879.2 filed Feb. 4, 2015, the entire contents of both of which are incorporated herein by reference.

FIELD

The present disclosure generally relates to sandwich materials that include a layer of plastic disposed between two metallic cover layers.

BACKGROUND

The German laid-open specification 10 2011 054 362 has disclosed a method for producing a composite sheet part with a metallic edge region. Said document has been recognized in the preamble as the closest prior art. Furthermore, the document discloses correspondingly produced components, which as large-area parts can be used in automobile construction as outer skin parts, because, in relation to the dimensioning of the components, weight can be saved through the use of sandwich materials in relation to solid materials. Such components with a metallic edge can, on conventional vehicle production lines, be subjected to preferably resistance spot welding without problems in the manner of monolithic materials, because electrical contact between the metallic surface layers is ensured in the edge region.

DETAILED DESCRIPTION

Figure 1:
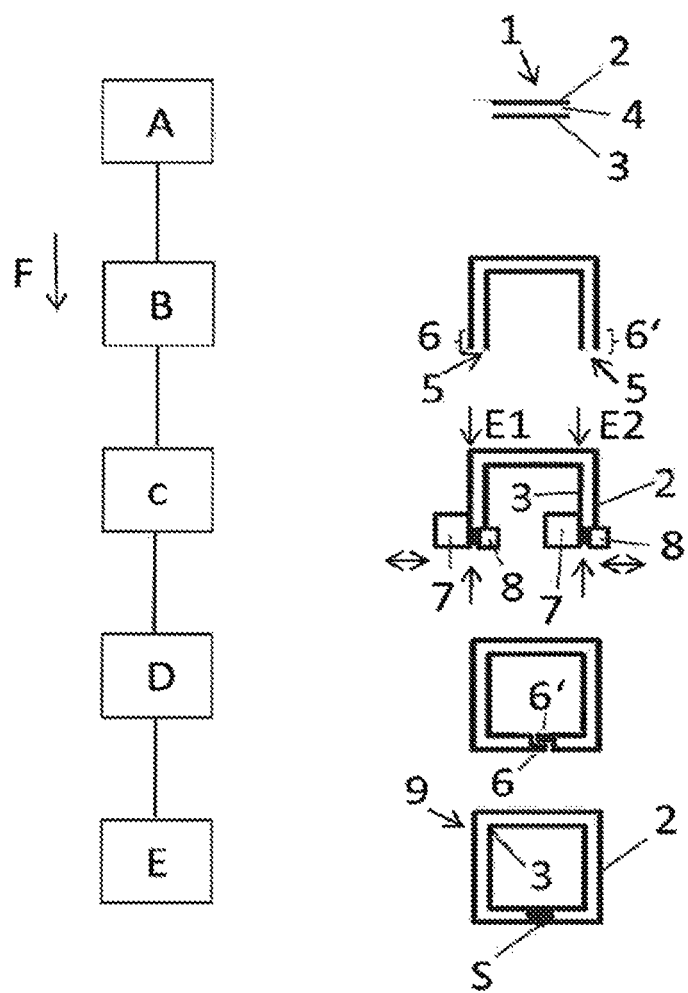
FIG. 1 is a schematic flow diagram illustrating a sequence of steps of an example method for the production of a component, along with corresponding schematic sectional views of the example component at various steps in the sequence.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns methods for producing a component from a sandwich material in sheet or strip form, which sandwich material comprises at least two metallic surface layers and at least one layer comprised of a plastic arranged between the metallic surface layers. The sandwich material may be at least partially heated at least along at least one selected edge region in order to soften the plastic in the edge region, which plastic is substantially completely displaced out of the edge region by action of force on at least one of the metallic surface layers. In this way, a plastic-free edge region is produced in which the metallic surface layers are in contact in regions or at points. The present disclosure generally further concerns a component comprised of a sandwich material that comprises at least two metallic surface layers and at least one layer comprised of a plastic arranged between the metallic surface layers. The sandwich material may have, at least along one edge, a plastic-free region in which the metallic surface layers are in contact in regions or at points.

One example object of the present disclosure is to provide a method with which components can be produced from sandwich materials in particular in the form of profiles, which are considerably more lightweight than metal profiles, and to specify corresponding components composed of sandwich materials.

The above-stated object is achieved in that two mutually oppositely situated plastic-free edge regions are produced on the sandwich material, and the sandwich material is deformed such that the two plastic-free edge regions are positioned so as to overlap one another or so as to be in contact with one another in the manner of a butt joint, and the plastic-free edge regions are connected to one another in said position in positively locking, non-positive locking and/or cohesive fashion in regions or at points.

By virtue of the fact that no plastic is present in the connecting region, a component composed of a sandwich material can be produced in the form of a substantially closed profile with a durable connection, which profile has a lower weight than metal profiles whilst having similar characteristics if, on the sandwich material, firstly two mutually oppositely situated plastic-free edge regions are produced, wherein, by means of further deformation of the sandwich material, the two plastic-free edge regions are positioned so as to overlap one another or so as to be in contact in the manner of a butt joint and are connected to one another in said position in positively locking, non-positively locking and/or cohesive fashion in regions or at points.

In a first refinement of the method according to the invention, the sandwich material is deformed firstly to form an open profile, in particular substantially to form a U-shaped profile, before the displacement of the plastic out of the two edge regions is performed. This is advantageous because, in particular, the protruding limbs produced in the case of the U-shaped profile point substantially in one and the same direction and, in this way, the plastic from the edge regions can be relatively easily heated and/or displaced, separated off and/or conveyed away by suitable means. The orientation of the limbs and displacement of the plastic out of the edge regions are preferably performed in the direction of gravitational force.

In a further refinement of the method according to the invention, the deformation may be performed by folding or U-O shaping, preferably in conventional deformation tools. This has the advantage that use can be made of existing installations for deforming in particular sheet-like sandwich materials, wherein preferably, the displacement of the plastic out of the two opposite edge regions is performed in a separate method step or in a separate device, for example in a device as disclosed in the abovementioned laid-open specification, in the case of the folding or U-O shaping. In this way, cumbersome and expensive conversion of conventional deformation tools, in the case of for example low investment in installations, as presented for example in FIG. 12 of DE 10 2011 054 362, can be avoided. Alternatively, the deformation in particular of sandwich material in strip form may be performed by roll profiling on preferably conventional profiling installations, wherein preferably, the displacement of the plastic out of the two opposite edge regions is performed inline in the case of the roll profiling. In particular, suitable means for heating and/or for displacing the plastic can be integrated into existing installations by minor adaptation and low installation investment. The folding, the U-O shaping and the roll profiling as shaping processes are prior art.

In a further refinement of the method according to the invention, a cohesive connection is performed by means of adhesive bonding or welding, in particular by means of roll seam welding, mash seam welding, laser welding or resistance spot welding. Alternatively or in addition, a non-positively locking and/or positively locking connection, in particular a mechanical connection, may also be performed by means of, for example, clinching or punch riveting.

According to a further aspect of the present invention, the object stated in the introduction is achieved, for a component, in that the sandwich material has two mutually oppositely situated plastic-free edge regions which, in a position in which they overlap or are in contact in the manner of a butt joint, are connected to one another in positively locking, non-positively locking and/or cohesive fashion in regions or at points.

From sandwich materials, components in the form of substantially closed profiles can be produced which have a durable connection owing to the plastic-free edge regions. The sandwich material comprises at least two metallic surface layers and at least one layer composed of a plastic arranged between the metallic surface layers, wherein the sandwich material has, at least along one edge, a plastic-free region in which the metallic surface layers are in contact in regions or at points, wherein the material thickness of the at least one, preferably of the at least two, metallic surface layer(s) is at most 1.5 mm, in particular at most 1.0 mm, preferably at most 0.5 mm and particularly preferably at most 0.35 mm, and the material thickness of the layer composed of plastic is at least 0.2 mm, in particular at least 0.3 mm, preferably at least 0.4 mm. The at least two metallic surface layers have in each case a material thickness of at least 0.05 mm, preferably at least 0.1 mm, and the layer composed of plastic has a material thickness of at most 8.0 mm, in particular at most 5.0 mm, preferably at most 3.0 mm, particularly preferably at most 2.0 mm. The characteristics of the profiled sandwich material may, in the case of similar material thickness, substantially correspond to those of a profiled solid material whilst having a simultaneously reduced mass. Further potential for a lightweight construction exists if the metallic surface layers are formed with different thickness in a manner dependent on the application.

In a further refinement of the component according to the invention, the at least one, preferably the at least two, metallic surface layer(s) is/are formed from a steel material. Steel materials are duly slightly heavier than other metals, in particular than light metal materials, but are inexpensive to procure and easy to process, in particular to deform in a cold state. In particular, use is made of steel materials which are metallic coated, preferably on both sides. As coatings, use may be made of zinc- or aluminum-based systems, wherein zinc-plated steel materials are particularly preferably used, because they can be provided inexpensively. Also conceivable is use of light metal materials as metallic surface layers, for example aluminum materials and/or magnesium material and/or any combination thereof, in particular also in combination with steel materials, whereby the weight can be further reduced owing to the lower density of the light metal materials in relation to steel materials.

In a further refinement of the component according to the invention, the at least one layer composed of plastic is preferably formed from a thermoplastic material. The thermoplastic material is in particular temperature-resistant to at least 160° C., preferably to at least 180° C., particularly preferably to at least 200° C. Preferred plastics are for example systems based on PA, PE and/or the mixtures thereof.

In a further refinement of the component according to the invention, the component is a folded profile or U-O profile. Alternatively, the component is a rolled profile.

In a further refinement of the component according to the invention, in the sandwich material, the sum of the material thicknesses of the metallic surface layers substantially corresponds to the material thickness of the layer composed of plastic. This is advantageous because, preferably, no offset in the position of mutual overlap and contact of the plastic-free edge regions can occur.

FIG. 1 schematically illustrates a sequence of steps for the production of a first exemplary embodiment of a component according to the invention in accordance with a first refinement of a method according to the invention, based on the example of roll profiling. In step A, a coil of a sandwich material 1 in strip form, for example in the form of a slit strip, is preferably provided (not illustrated). The sandwich material 1 comprises at least two metallic surface layers 2, 3, wherein the material thickness of the respective metallic surface layer 2, 3 is at most 1.5 mm, in particular at most 1.0 mm, preferably at most 0.5 mm and particularly preferably at most 0.35 mm, wherein the metallic surface layers are preferably formed from a steel material and are preferably electrolytically zinc-plated on both sides, and at least one layer 4 composed of a plastic arranged between the metallic surface layers 2, 3, wherein the material thickness of the layer composed of plastic is at least 0.2 mm, in particular at least 0.3 mm, preferably at least 0.4 mm, wherein the plastic is formed from a thermoplastic material and is temperature-resistant in particular to at least 160° C., preferably to at least 180° C., particularly preferably to at least 200° C. A schematic sectional view of the sandwich material 1 is illustrated on the right-hand side in FIG. 1.

The coil in strip form, for example slit strip, is unwound, is straightened and/or cleaned in continuous fashion possibly in one or more stations (not illustrated), and is fed to at least one first station (step B) in which, firstly, the sandwich material 1 is continuously deformed by means of at least one first set of profiling rollers (profiling rolls) (not illustrated) to form an open profile, in particular substantially to form a U-shaped profile. A schematic cross-sectional view of the U-shaped profile that is produced is illustrated on the right-hand side in FIG. 1, wherein preferably, the protruding limbs 5, 5' produced in the U-shaped profile point substantially in one and the same direction.

After the production of the U-shaped profile, in step C, the two mutually oppositely situated edge regions 6, 6' of the sandwich material 1 are, in the conveying direction F, at least partially heated by suitable means (not illustrated here) in order to soften the plastic in the edge region 6, 6'. Use may be made of radiative, inductive and/or conductive means for heating, for example using inductors arranged at the edge regions 6, 6' and/or using temperature-controlled rolls (not illustrated) which make contact. Under the action of temperature, the plastic 4 softens, which plastic is displaced out of the edge region 6, 6' by action of force on at least one of the metallic surface layers 2, 3 using suitable means, for example using rolls 7, 8, and in particular, the displacement of the plastic 4 out of the edge region 6, 6' is performed inline. A schematic cross-sectional view at the time of the displacement of the plastic 4 for the generation of a plastic-free edge region 6, 6' on the U-shaped profile is illustrated on the right-hand side in FIG. 1. On the left-hand side of the limb 5, the left-hand roll 7 merely makes contact with the metallic surface layer 2 in the plane E1 without imparting a shaping action, and counteracts the force exerted by the right-hand roll 8 and deformation of the metallic surface layer 3 for the displacement of the plastic and production of a plastic-free edge region 6. On the right-hand side of the limb 5', the left-hand roll 7 merely makes contact with the metallic surface layer 3 in the plane E2 without imparting a shaping action, and counteracts the force exerted by the right-hand roll 8 and deformation of the metallic surface layer 2 for the displacement of the plastic and production of a plastic-free edge region 6'. The double arrow indicates that the rolls 7, 8 are adjustable individually and in accordance with demand in order to shape the plastic-free edge regions 6, 6' as desired, in particular in a manner dependent on the type of connecting region to be produced (overlapping or butt-jointed). By virtue of the fact that the protruding limbs 5, 5' produced in the case of the U-shaped profile point substantially in one and the same direction, preferably in the direction of gravitational force, the displaced or emerging soft plastic can be relatively easily separated off (collected) and/or conveyed away.

The U-shaped profile produced from the sandwich material 1 in strip form and with plastic-free edge regions 6, 6' is fed in continuous fashion to a further station (step D) in which the sandwich material 1 is deformed by means of at least one further set of profiling rollers (profiling rolls) (not illustrated) such that the two plastic-free edge regions 6, 6' are positioned so as to overlap one another. A schematic cross-sectional view of the sandwich material 1 thus shaped to form a substantially closed profile is illustrated on the right-hand side in FIG. 1. Alternatively, and in a manner which is not illustrated, the two plastic-free edge regions may be positioned so as to be in contact in the manner of a butt joint.

After the deformation to form a substantially closed profile, the sandwich material 1 in strip form is fed in continuous fashion to a further station (step E), in which the sandwich material 1 in strip form (closed profile) is either cut to length and, in a separate step or device, the plastic-free edge regions are, in the mutually overlapping position, connected to one another in positively locking, non-positively locking and/or cohesive fashion in regions or at points (not illustrated), or firstly, in continuous fashion, the plastic-free edge regions 6, 6' are, in the mutually overlapping position, connected to one another in positively locking, non-positively locking and/or cohesive fashion in regions or at points, preferably are connected to one another at least in regions, particularly preferably entirely along the plastic-free edge regions 6, 6' in cohesive fashion by roll seam welding, mash seam welding or laser welding, and subsequently, the sandwich material 1 in strip form produced so as to form a closed profile at least in regions is cut to length (not illustrated). In the simplest embodiment, a component 9 according to the invention is provided as a rolled profile with a constant cross section, in this example with a rectangular cross section, for further use, this being illustrated in a schematic cross-sectional view on the right-hand side in FIG. 1. For example, the material thicknesses of the metallic surface layers are coordinated with the material thickness of the layer composed of plastic, and preferably, the sum of the material thicknesses of the metallic surface layers substantially corresponds to the material thickness of the layer composed of plastic, whereby no offset occurs in the region of the connection S, either on the side of the inner metallic surface layer 3 or on the side of the outer metallic surface layer 2. Such components may be used in all sectors in which lightweight construction is used, for example in the construction of road-going or rail-going vehicles, such as motor vehicles, utility vehicles, heavy goods vehicles, rail vehicles and in the aerospace or shipbuilding sectors.

Alternatively, and in a manner not illustrated here, the deformation of sandwich materials preferably in sheet form may be performed by folding or by U-O shaping, for example in conventional deformation tools, whereby use can advantageously be made of existing installations. The displacement of the plastic out of the two opposite edge regions may for example be performed in a separate method step or in a separate device in the case of the folding or in the case of the U-O shaping, wherein the two plastic-free edge regions, which are positioned either so as to overlap one another or so as to be in contact in the manner of a butt joint, are also connected to one another in positively locking, non-positively locking and/or cohesive fashion in regions or at points for example in a separate method step or in a separate device. This eliminates the need for cumbersome and expensive conversion of conventional deformation tools.

Figure 2:
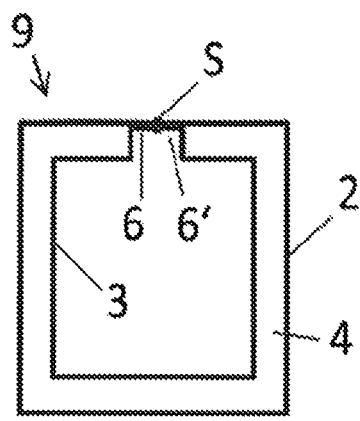
FIG. 2a is a schematic cross-sectional view of another example component.
FIG. 2b is a schematic cross-sectional view of still another example component.
Figure 2:
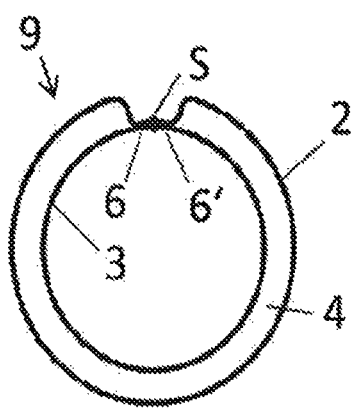

FIG. 2a illustrates a second exemplary embodiment of a component 9 according to the invention, but with the difference in relation to the rolled profile shown in FIG. 1 that the plastic-free edge regions 6, 6' have been deformed such that they are, in a position in which they make contact in the manner of a butt joint, connected to one another in positively locking, non-positively locking and/or cohesive fashion, for example by means of laser welding via a weld seam S, in regions or at points. The third exemplary embodiment illustrated in FIG. 2b differs from the second exemplary embodiment firstly by a circular cross section and secondly by the fact that, at the butt joint, the inner metallic surface layer 3 has no offset with respect to the outer metallic surface layer 2 of the component 9. Without the presence of plastic in the edge regions, durable connections S can be provided on the components 9 according to the invention (closed profiles). The second and third exemplary embodiment may be produced both by folding or U-O shaping or by roll profiling. Alternatively or in addition, a non-positively locking and/or positively locking connection, in particular a mechanical connection, may also be performed by means of, for example, clinching or punch riveting.

The invention is not restricted to the exemplary embodiments illustrated in the drawing, and components according to the invention may rather also have cross sections which are not constant over the length, in particular if said components are formed by means of folding or U-O shaping from a sandwich material in sheet form, for example from a blank that has been correspondingly cut to size.

LIST OF REFERENCE DESIGNATIONS

1 Sandwich material (in strip form, in sheet form)
2, 3 Metallic surface layer
4 layer composed of plastic
5, 5' Limb
6, 6' Edge region
7, 8 Rolls
9 Component, closed profile
A, B, C, D, E Step sequence, method steps
E1, E2 Plane
F Conveying direction
S Connection, weld seam

What is claimed is:

1. A method for producing a component from a sandwich material in sheet or strip form, wherein the sandwich material comprises a plastic layer disposed between two metallic surface layers, the method comprising:
   producing first and second plastic-free edge regions on the sandwich material that mutually oppose one another, each of the first and second plastic-free edge regions being formed by
      heating the sandwich material at least partially along an edge region to soften the plastic layer in the edge region, and
      displacing the plastic layer substantially completely out of the edge region by exerting a force on at least one of the two metallic surface layers to produce a plastic-free edge region in which the two metallic surface layers are in contact at sub-regions or at points of the plastic-free edge region;
   deforming the sandwich material such that the first and second plastic-free edge regions at least one of contact one another in a manner of a butt joint or overlap; and
   connecting the first and second plastic-free edge regions to one another in a positively locking fashion, in a non-positively locking fashion, or in a cohesive fashion at the sub-regions or at the points of the first and second plastic-free edge region.

2. The method of claim 1, comprising deforming the sandwich material to form an open profile before displacement of the plastic layer.

3. The method of claim 2, wherein the open profile is U-shaped.

4. The method of claim 2, wherein the deformation to form the open profile is performed by folding, by U-O shaping, or by roll profiling.

5. The method of claim 4, wherein the displacement of the plastic layer is performed in a separate method step when the deformation to form the open profile is performed by folding or U-O shaping.

6. The method of claim 4, wherein the displacement of the plastic layer is performed in line when the deformation to form the open profile is performed by roll profiling.

7. The method of claim 1, wherein connecting the first and second plastic-free edge regions to one another comprises connecting the first and second plastic-free edge regions in the cohesive fashion in a cohesive connection that is performed by adhesive bonding or welding.

8. The method of claim 1, wherein connecting the first and second plastic-free edge regions to one another comprises connecting the first and second plastic-free edge regions in the cohesive fashion in a cohesive connection that is performed by roll seam welding, mash seam welding, laser welding, or resistance spot welding.

9. The method of claim 1, wherein connecting the first and second plastic-free edge regions to one another comprises clinching or punch riveting the first and second plastic-free edge regions to connect the first and second plastic-free edge regions in either the positively locking fashion or the non-positively locking fashion.

* * * * *